Jan. 14, 1936.  W. F. ERRIG ET AL  2,028,053
CROSS GROOVER FOR TIRES
Filed June 18, 1935   2 Sheets-Sheet 1
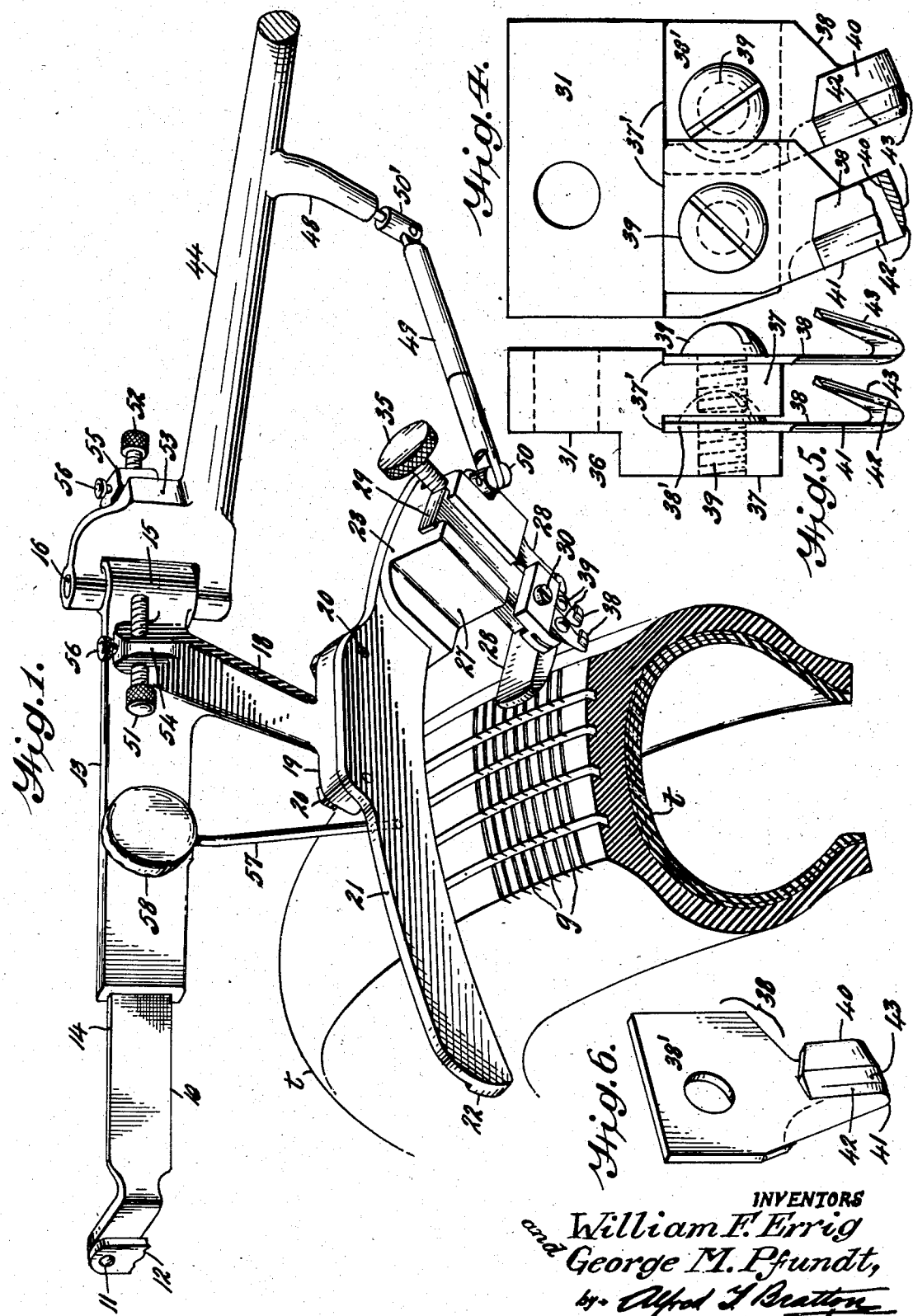
INVENTORS
*William F. Errig*
*and George M. Pfundt,*
by *Alfred J. Bratton*
ATTORNEY.

Jan. 14, 1936.  W. F. ERRIG ET AL  2,028,053
CROSS GROOVER FOR TIRES
Filed June 18, 1935   2 Sheets-Sheet 2
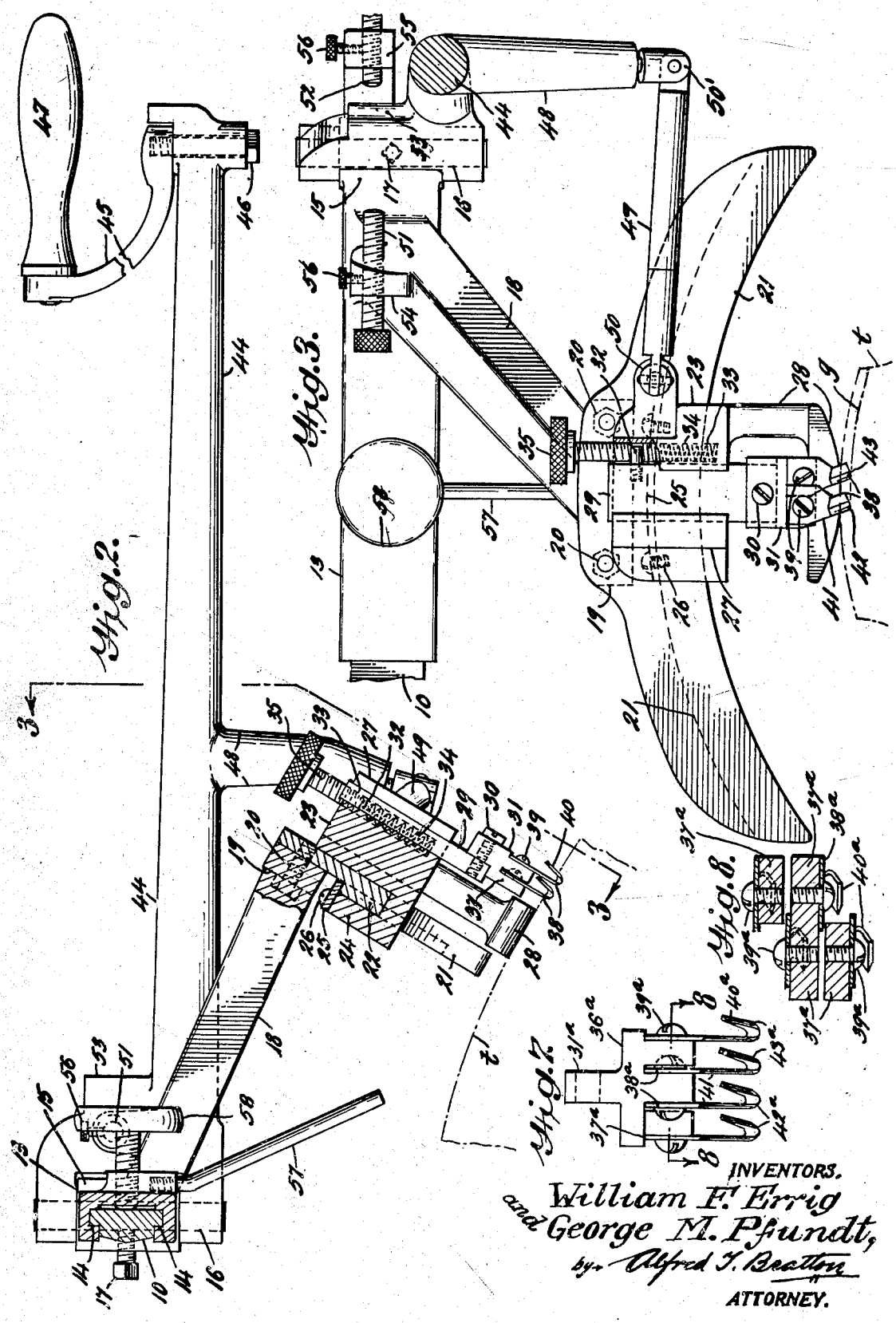
INVENTORS.
William F. Errig
and George M. Pfundt,
by Alfred T. Bratton
ATTORNEY.

UNITED STATES PATENT OFFICE 2,028,053

CROSS-GROOVERS FOR TIRES

William F. Errig, Philadelphia, and George M. Pfundt, Churchville, Pa., assignors to Peco Manufacturing Corporation, Philadelphia, Pa., a corporation of Pennsylvania Application June 18, 1935, Serial No. 27,228

11 Claims. (Cl. 90—24.3)

This invention relates to cross-grooving devices, that is to say, means whereby transverse cuts, in predetermined or variably spaced relation, may be accurately cut at right angles to a lengthwise dimension, or the rotative plane of a wheel tire for example.

More specifically the present invention is devised for the cross-grooving of solid, inflated or deflated, rubber tires of vehicles initially, or to effect re-grooving of such tires when worn or damaged so that their tractive efficiency may be restored.

The primary object of the instant invention is to provide a tire groover of the indicated type which will positively effect the cross-grooving or re-grooving of a vehicle tire, with grooves of even depth transversely of said tire, in a minimum of time and with a corresponding saving of labor.

Another object is to provide a tire cross-groover or re-groover which will efficiently groove or re-cut any standard size of tire with a minimum of adjustment in accommodating it to different depths and lengths of grooves laterally of the tire, while accurately following the transverse curvature or tread thereof.

A further object is to provide a tire cross-groover which will cut multiple cross-grooves or slots at one and the same time with positive assurance that each of such grooves is of the requisite depth and all of which are uniformly spaced.

A still further object is the provision of a cross-groover for tires and analagous usage which may be operatively set-up in any convenient location where a vehicle tire requiring re-grooving, more particularly, can be rotatively supported therebelow; or a device which is readily attachable to and cooperative with a tire grooving machine of the character disclosed in our prior Patent No. 1,916,258, dated July 4, 1933.

Other objects and ancillary advantages of the invention will appear more fully hereinafter, when considered in connection with the accompanying sheets of drawings; while it is to be clearly understood the subject-matter hereof is not confined to the exact features shown and described, various changes being readily made within the scope of what is later on particularly claimed, without departure from the spirit of our improvements or the restrictions imposed by prior art.

In the drawings:—

Fig. 1 is a perspective view of a practical embodiment of the present invention, supported in operative relation to a fragmentary portion of a conventional vehicle tire of the pneumatic variety, and with a portion of the manipulating member broken-off for ease in illustration.

Fig. 2 is a side elevation of the same with parts in section to better disclose hereinafter explained features of construction.

Fig. 3 is a section taken approximately on the plane designated 3—3 in Fig. 2.

Fig. 4 is side elevation of one form of holder for cutting plural grooves.

Fig. 5 is an end elevation of the same, or looking toward the right-hand of the preceding illustration.

Fig. 6 is a perspective view of one of the cutting-blades.

Fig. 7 is an end view of a blade-holder for cutting multiple grooves at one and the same time; and, Fig. 8 is a sectional plan taken on the plane designated 8—8 in Fig. 7.

In all the views of the drawings corresponding parts are designated by similar reference characters.

Referring more in detail to the drawings the numeral 10 designates a suitable support conveniently, although not essentially, pivotally mounted at 11, to stationary means 12; such as the hanger 17 and end members 13 of the patent hereinbefore referred to.

The support 10 is preferably disposed horizontal and affords bearing for the base or carrier 13 of the novel cross-groover forming the instant subject-matter. This carrier 13 is conveniently of the somewhat channel cross-section best understood from Fig. 2, for slidable engagement along the grooved edges 14 of the support 10, so as to ensure rigidity when adjusted, as later on explained; while it is provided at one end (the right-hand in the embodiment shown) with a vertically-directed apertured portion 15, having a pivot pin 16 secured therein by means of a lock-screw 17, for a purpose hereinafter explained.

Integrally formed with the carrier 13 is a projecting downwardly-directed and laterally-inclined arm 18 having at its free end a transverse flange or head 19 to which is conveniently attached, as by securing means 20, an arcuate track 21. This track 21, it is to be particularly noted is formed with its lower edge of a curvature intermediate the tread cross-sectional curvatures of the standard tire-sections so that tires of ordinary usage can all be cross-grooved with our improved device without the necessity of substituting a different track 21 and associated means, as later on again referred to; while said track is formed or provided with an enlargement or runner portion 22.

Adapted for reciprocatory coaction with the track 21 is a block or carriage 23 of somewhat U-shaped cross-section, as best shown in Fig. 2, the shorter leg 24 which is of a depth corresponding with that the runner 22, and said carriage is operatively engaged with the track 21, through the medium of a follower-plate 25 secured to the leg 24 by set-screws 26, in an obvious manner. The longer leg or frontal-portion 27 of the carriage 23 is formed or provided with a depending somewhat L-shaped shoe 28, the lower lateral portion of which is suitably-shaped for seating on and following the cross or transverse tread-surface of a vehicle tire, as best understood from Fig. 3; whereby the cutting of cross grooves of even depth relative to the tire tread-curvature is positively ensured. The frontal portion 27 is also vertically-grooved for reception of a radially-directed slide member 29, to the lower end of which is secured, as by a clamp-screw 30, a cutter-holder-block 31, and said slide member is resiliently sustained through the medium of a pin 32 projecting laterally from one side into a vertical screw-threaded bore 33, intermediate a cushioning spring 34 and an adjuster screw 35. Thus it will be readily understood that the cutter-holder 31 is normally held supported intermediate the adjuster screw 35 and the spring 34.

The cutter-holder block 31 of Figs. 1–5 inclusive, it will be seen, is shouldered at 36 for rigid coaction with the lower end of the slide member 29, while it is provided at its lower part with predeterminedly-spaced paralleling lugs 37 affording shoulder 37' for abutment of the upper edges of a pair of relatively-staggered cutting-blades 38 secured thereto by set screws 39. Each of these blades is preferably made of suitable sheet metal and embodies a head or attaching section 38' with a depending somewhat hook-like cutter portion 40. As best appreciated from Figs. 4 and 6, it will be observed that the knife edge 41 of each cutting blade 38 is formed with differently inclined surfaces 42, 43, the former or forward 42 of which is directed at an angle for efficient cutting while the latter or trailing 43 is at an obtuse-angle relative thereto, and serves during the cutting operation to project the strip cut out to form a cross-groove away from, or from recoiling thereinto, which recoiling we have noted is a serious objection common to known grooving devices.

Fulcrumed on the pin 16 hereinbefore referred to is the forked end of an operating member 44 to the free end of which is attached, by a curved bracket 45 and set screw 46, the pivoted manipulator to keep the wrist of the operator at all times in easy operative alignment with the direction of effort, or handle 47 to obviate wrist fatigue; while said member 44 is provided with a downwardly extending arm 48, operatively-coordinated to the carriage 23, aforesaid by means of a connecting rod 49 having universal end-articulations 50, 50'.

Lateral limitation of the cross-grooving operation, or the travel of the carriage 23 is controlled by means of opposing adjuster screws 51, 52 adapted for coaction with a projection 53 at the forked end of the member 44; the former of said screws 51 threadedly engaging through a lug 54 on the arm 18 and the latter 52 being similarly mounted in an offset 55 of the carrier base 13, and both of said screws are locked at the desired adjustment by thumb screws 56, in an obvious manner.

For centralizing the cutter carrier 13 relative to a tire "t" preparatory to effecting the cross-grooving operation we provide said carrier with a depending finger or index pointer 57 threadedly engaged therein, as best shown by Fig. 2, and provide a securing means 58 for clamping the carrier at the proper adjustment.

In the use of our improved cross-groover as above disclosed all that is primarily necessary is for the carrier 13 to be conveniently supported with capacity for lateral movement above a rotatably supported tire "t" whereupon the operator centralizes the same relative to said tire by means of the index pointer 57, and tightens up the securing means 58. The reciprocatory travel of the carriage 23 is next set by means of the adjuster-screws 51, 52 in an obvious manner, whereupon it will be clearly apparent that by swinging the member 44 from right to left, as viewed in the drawings, a pair of cross-grooves "g" can be cut in positive spacial parallelism directly-transverse of the tire-tread surface with a minimum of effort, and successively accomplished by incremental rotary movement of the tire "t" in any of the known ways.

The modified cutter-holder 31ª of Figs. 7 and 8 differs from that described in connection with the preceding views only in that it is adapted for carrying four instead of two blades 38ª in relatively staggered or stepped relation, accordingly all parts are similarly designated with corresponding reference indicia plus the exponent "a", in order to obviate the necessity for unnecessary repetitive description. Further, it will be readily appreciated that by provision and use of the modified cutter-holder 31ª, that the cross-grooving of a tire, or the re-grooving thereof, where worn, can be rapidly effected in a minimum of time and with a corresponding saving of labor and overhead expense, it being obvious that by proper location of the respective cutting blades 38ª laterally and longitudinally relative to the thread surface of a tire "t" that the effort requisite to effect actual grooving can be reduced to a minimum.

From the foregoing it will be apparent that various structural changes from the illustrated form of the invention can be readily effected without departing from the spirit of said invention, while the scope of the following claims is correspondingly only limited by what the prior art demands.

Having thus described our invention, we claim:

1. In a device of the type described the combination of a carrier adapted for support transversely of a progressively rotatable article to be circumferentially cross-grooved, an arcuate member supported in advance of the carrier, a carriage movable on the arcuate member, a cutter head vertically adjustable on said carriage, and means including an operating member having pivotal connection with the carrier and with the carriage to reciprocate said carriage over the arcuate member to effect the cross-grooving operation.

2. In a device of the type described the combination of a carrier adapted for support transversely over a progressively rotatable article to be circumferentially cross-grooved, an arcuate track supported in advance of and below the carrier, a carriage movable on the arcuate track, a head vertically adjustable in the carriage and having plural cutters, and means comprising an operating arm pivotally connected with the carrier and carriage to reciprocate the carriage over the arcuate track to effect the cross-grooving operation.

3. In a device of the type described the combination of a carrier adapted for support transversely above an intermittently rotatable tire to be circumferentially cross-grooved, an arcuate track supported in a lower plane by and in advance of said carrier, a carriage on the arcuate track, a resiliently-supported head vertically-adjustable in the carriage and having plural cutters at its lower end, and means comprising an arm having pivotal connection with the carrier and carriage, whereby the latter is reciprocable over the arcuate track to effect the cross-grooving operation.

4. In a device of the type described the combination of a carrier adapted for support transversely above an incrementally rotatable tire to be circumferentially cross-grooved, an arcuate track supported in a lower plane by and in advance of said carrier, a carriage movable along the arcuate track, a resiliently-supported cutter head vertically-adjustable in the carriage and supporting plural hook-like cutters at its lower end, an L-shaped guide arranged on said carriage adjacent the head to limit the depth of cut, means swingably-supported by the carrier aforesaid and universally-coordinated to the carriage whereby the latter is reciprocable over the arcuate track transversely of the tire to effect the cross-grooving operation, and adjustable means on the carrier engageable with the swingably supported means for determining the extent of reciprocation for said carriage.

5. The combination of claim 4 wherein the cutter tread is supported by a slide member in a vertically-grooved portion of the carriage, said member having a lateral projection seating on a cushioning spring in a slotted bore in the carriage in opposition to an adjuster screw determining the depth of the cross-grooves.

6. The combination of claim 4 wherein the means coordinating the carrier and carriage for reciprocation of the latter comprise an operating member vertically pivoted to the carrier and having a downwardly-directed arm, and a connecting rod having its ends respectively and universally-coupled to the carriage and to the free end of said operating member.

7. The combination of claim 4 wherein the means determining the extent of travel for the carriage comprise a projection on the operating member, a lug on the carrier arm and an offset on said carrier, opposed adjuster screws threadedly engaged in said lug and offset for alternate engagement by the operating member projection, and means whereby the said screws can be secured at the requisite adjustment.

8. In a device of the type described the combination of a carrier adapted for support transversely above an incrementally rotatable tire to be circumferentially cross-grooved, an arcuate track supported in a lower plane by and in advance of said carrier, a carriage movable along the arcuate track, a resiliently-supported head vertically-adjustable in the carriage and supporting plural hook-like cutters at its lower end, means swingably-supported by the carrier aforesaid and universally-coordinated to the carriage whereby the latter is reciprocable over the arcuate track transversely of the tire to effect the cross-grooving operation, adjustable means determining the extent of reciprocation for said carriage, and means whereby the carrier can be initially centralized relative to the tire tread.

9. In a device of the class described, the combination with a carrier adapted for support above a rotatable tire to be cross grooved, a track supported by the carrier, a carriage mounted on the track, means connecting the carrier and carriage to move the latter along the track, cutters on the carriage to effect cross grooving of the tire, and a centralized index pointer supported on the carrier.

10. A device as claimed in claim 9, wherein means are provided for locking the carrier in varying positions of adjustment.

11. In a device of the character described, the combination of a carrier for support transversely above an intermittently rotatable tire to be circumferentially cross grooved, an arcuate track supported in a lower plane by and in advance of the carrier, a carriage on the track, a resiliently supported cutter head vertically adjustable in the carriage and having cutters at its lower end, means swingably supported by the carrier and universally coordinated with the carriage, whereby the carriage is reciprocable over the track to effect the cross grooving operation, and adjustable means on the carrier engagable with the swingably supported means to limit the swinging movement thereof.

WILLIAM F. ERRIG.
GEORGE M. PFUNDT.